US011156996B2

(12) United States Patent
Schuster et al.

(10) Patent No.: US 11,156,996 B2
(45) Date of Patent: Oct. 26, 2021

(54) BUILDING ANALYSIS SYSTEM WITH MACHINE LEARNING BASED INTERPRETATIONS

(71) Applicant: Johnson Controls Tyco IP Holdings LLP, Milwaukee, WI (US)

(72) Inventors: Kelsey Carle Schuster, Wauwatosa, WI (US); Christopher J. Verink, Glendale, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 182 days.

(21) Appl. No.: 16/413,892

(22) Filed: May 16, 2019

(65) Prior Publication Data

US 2020/0363794 A1  Nov. 19, 2020

(51) Int. Cl.
| | | |
|---|---|---|
| G05B 23/02 | (2006.01) | |
| G05B 13/04 | (2006.01) | |
| G05B 13/02 | (2006.01) | |
| G06N 5/02 | (2006.01) | |
| F24F 11/30 | (2018.01) | |
| G06N 20/00 | (2019.01) | |
| G06N 5/04 | (2006.01) | |
| F28F 27/00 | (2006.01) | |

(52) U.S. Cl.
CPC .......... *G05B 23/0283* (2013.01); *F24F 11/30* (2018.01); *F28F 27/00* (2013.01); *G05B 13/027* (2013.01); *G05B 13/048* (2013.01); *G05B 23/0216* (2013.01); *G06N 5/02* (2013.01); *G06N 5/04* (2013.01); *G06N 20/00* (2019.01); *G05B 2219/24086* (2013.01)

(58) Field of Classification Search
CPC .......... G05B 13/027; G05B 13/048; G05B 23/0216; G05B 23/0283; G05B 23/0286; G05B 2219/24086; G05B 2219/24104; G06N 5/00; G06N 5/02; G06N 5/04; G06N 20/00; F24F 11/30; F28F 27/00
See application file for complete search history.

(56) References Cited

U.S. PATENT DOCUMENTS

| | | | | |
|---|---|---|---|---|
| 8,214,188 | B2 * | 7/2012 | Bailey | E21B 7/00 |
| | | | | 703/10 |
| 10,433,112 | B2 * | 10/2019 | Santarone | G01S 5/0284 |
| 10,467,353 | B2 * | 11/2019 | Santarone | G06Q 10/06393 |
| 10,762,251 | B2 * | 9/2020 | Santarone | G06T 19/006 |
| 10,844,290 | B2 * | 11/2020 | Van de Cotte | C07C 5/333 |
| 11,009,865 | B2 * | 5/2021 | Cella | H04L 67/1097 |
| 2011/0214878 | A1 * | 9/2011 | Bailey | E21B 7/00 |
| | | | | 166/369 |

(Continued)

FOREIGN PATENT DOCUMENTS

JP       2002071448 A  *  3/2002

*Primary Examiner* — Crystal J Barnes-Bullock
(74) *Attorney, Agent, or Firm* — Foley & Lardner LLP

(57) ABSTRACT

A vibration analysis system for predicting performance of a building system includes one or more memory devices configured to store instructions that, when executed on one or more processor, cause the one or more processors to receive vibration data from the building equipment, generate a performance prediction for the building equipment, generate a performance explanation for the performance prediction, and cause a user interface to display the performance prediction and the performance explanation.

20 Claims, 7 Drawing Sheets

(56) References Cited

U.S. PATENT DOCUMENTS

| | | | |
|---|---|---|---|
| 2015/0107824 A1* | 4/2015 | Signorelli | E21B 41/0085 |
| | | | 166/244.1 |
| 2017/0308802 A1* | 10/2017 | Ramsoy | G06N 20/10 |
| 2018/0024847 A1* | 1/2018 | Campbell | H04L 67/12 |
| | | | 715/708 |
| 2018/0283811 A1* | 10/2018 | Victor | G05B 13/048 |
| 2019/0171187 A1* | 6/2019 | Cella | G05B 23/0221 |
| 2020/0089215 A1* | 3/2020 | Cella | G05B 19/41875 |
| 2020/0225655 A1* | 7/2020 | Cella | G06N 3/0472 |
| 2020/0348662 A1* | 11/2020 | Cella | G05B 23/0289 |
| 2020/0380387 A1* | 12/2020 | Pourmohammad | F24F 11/30 |
| 2021/0157312 A1* | 5/2021 | Cella | G05B 13/028 |

* cited by examiner

BUILDING ANALYSIS SYSTEM WITH MACHINE LEARNING BASED INTERPRETATIONS

BACKGROUND

The present disclosure relates generally to heating, ventilation, and air conditioning (HVAC) systems. The present disclosure relates more particularly to a vibration analysis system for HVAC systems.

A building can include building equipment such as an HVAC system, and a data analysis system configured to analyze data from the HVAC system to determine whether it is operating normally, in need of preventive maintenance, or is in danger of malfunctioning. Traditional data analysis systems have a specific set of criteria upon which the data are analyzed, and the criteria may only be modified manually. However, there are instances in which data that normally would indicate an issue with the HVAC system is not actually a concern. Additionally, there are instances in which the HVAC system is in need of maintenance but the set data analysis criteria do not provide notification of the maintenance need.

SUMMARY

One embodiment of the present disclosure is a vibration analysis system for predicting performance of building equipment that includes one or more memory devices configured to store instructions that can be executed on one or more processors. When executed on the one or more processors, the instructions cause the one or more processors to receive vibration data from the building equipment that indicates the performance of the building equipment, generate a performance prediction for the building equipment based on a prediction model, generate a performance explanation for the performance prediction, the performance explanation comprising an indication of one or more data points of the vibration data associated with the performance prediction and further comprising an explanation indicating one or more reasons that the performance prediction will occur, and cause a user interface to display the performance prediction and the performance explanation.

Another embodiment of the present disclosure is a method for predicting performance of building equipment. The method includes the step of receiving, by a processing circuit, vibration data from the building equipment, the vibration data indicating the performance of the building equipment. The method further includes the steps of analyzing, by the processing circuit, the vibration data with a data analysis model and generating, by the processing circuit, a performance prediction for the building equipment, the performance prediction based on the analyzed vibration data and a prediction model. The method includes generating, by the processing circuit, a performance explanation for the performance prediction, the performance explanation comprising an indication of one or more data points of the vibration data associated with the performance prediction and further comprising an explanation indicating one or more reasons that the performance prediction will occur, and displaying, on a user interface by the processing circuit, the performance prediction and the performance explanation to a user.

Another embodiment of the present disclosure is a building system comprising building equipment configured to operate to control one or more environmental conditions of the building, wherein the building equipment comprise one or more vibration sensors configured to collect vibration data while the building equipment operates to control the one or more environmental conditions. The building system also comprises a processing circuit configured to receive the vibration data from the building equipment, the vibration data indicating the performance of the building equipment, and generate, based on a prediction model and the vibration data, a performance prediction for the building equipment. The processing circuit is further configured to generate, based on the vibration data, a performance explanation for the performance prediction, the performance explanation comprising an indication of one or more data points of the vibration data associated with the performance prediction and further comprising an explanation indicating one or more reasons that the performance prediction will occur. The processing circuit is further configured to cause a user interface to display the performance prediction and the performance explanation.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
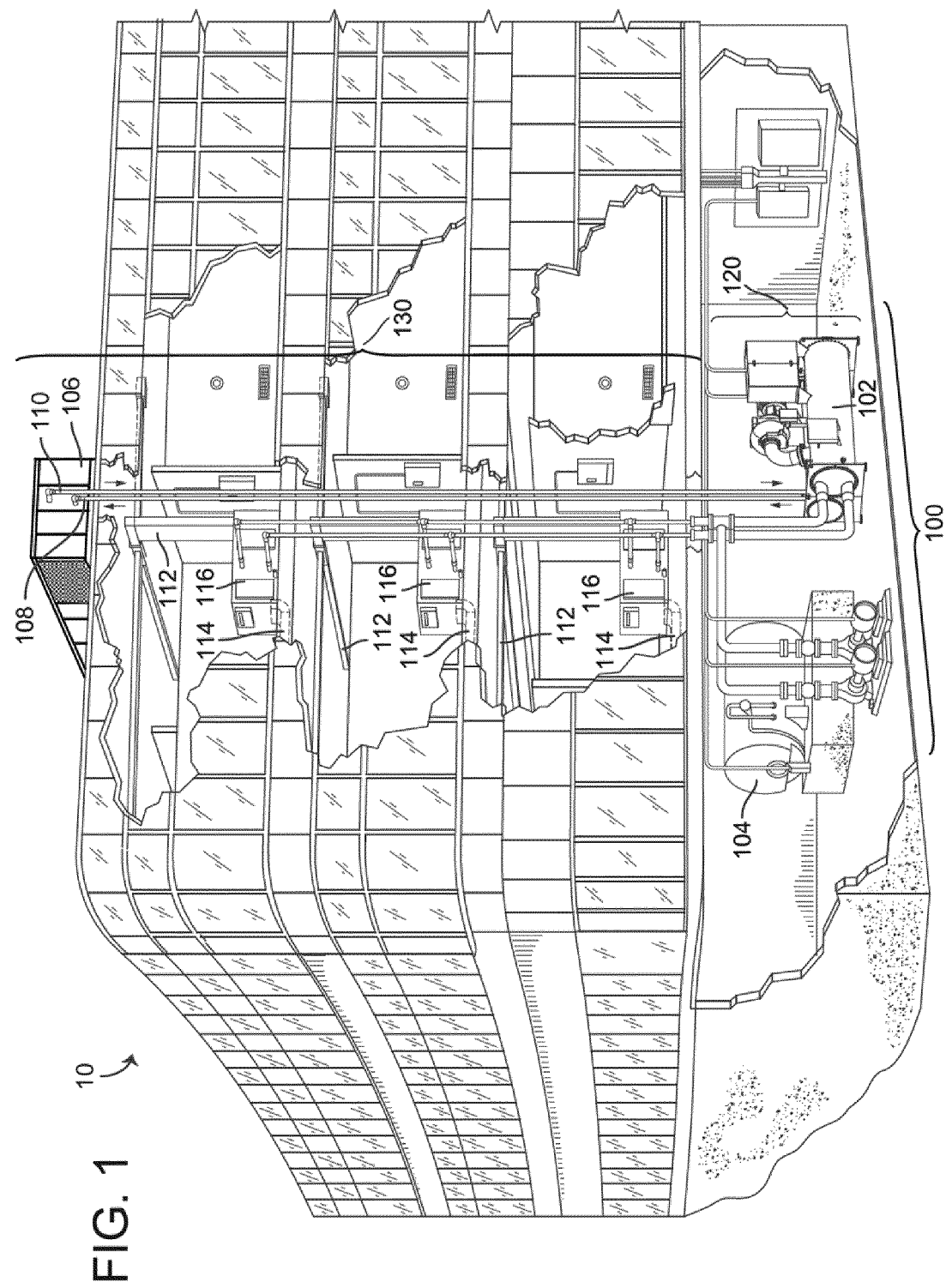
FIG. 1 is a drawing of a building equipped with a building management system (BMS) and a HVAC system, according to an exemplary embodiment.

Referring generally to the FIGURES, systems and methods are shown for predicting when a machine (e.g., a chiller, a boiler, an air handler unit, or any other building device) will shut down or need preventive maintenance based on vibration analysis, according to various exemplary embodiments. The systems and methods discussed herein can collect data from building equipment and analyze the collected data to determine whether the building equipment will shut down in the future due to a malfunction, or if the building equipment requires preventive maintenance to prevent such a shut down. As discussed herein, the determination of the maintenance status of building equipment, and the reasoning for such a determination, can be communicated to a user. The user can then indicate agreement or disagreement with the determination and reasoning.

The vibration analysis system is configured to receive historical data based on past performance of building equipment, in some embodiments. As the vibration analysis system receives operating data from the building equipment, the vibration analysis system is configured to compare the operating data to the historical data and determine whether the building equipment will shut down in the future due to a malfunction, or if the building equipment requires preventive maintenance to prevent such a shut down, in some embodiments. The vibration analysis system is configured to provide the user with a report regarding a conclusion determined by the vibration analysis system and/or is configured to provide the user with the reason the system arrived at the conclusion, in some embodiments. The user can analyze the conclusion of the system to determine whether the user agrees with the conclusion and the determinations of the vibration analysis system. If the user agrees with the conclusions generated by the vibration analysis system, the appropriate steps can be taken to address the issues with the building equipment. If the user disagrees with the conclusions generated by the vibration analysis system, the user will indicate disagreement with the vibration analysis system via a user interface, and the user will also include the reason for the disagreement. The vibration analysis system can be configured to incorporate the feedback from the user into its next analysis.

The vibration analysis system is configured to subsequently analyze the building equipment, and upon the subsequent analysis the vibration analysis system may determine the existence of conditions similar to those found previously when the user disagreed with the conclusions generated by the vibration analysis system. Instead of generating the same conclusion as it previously did, the vibration analysis system is configured to incorporate the feedback from the user in the analysis and may generate a different conclusion. Upon viewing the conclusion generated by the vibration analysis system, the user can indicate agreement with the conclusion, and the appropriate actions can be taken.

Using this system and method, complications associated with building equipment maintenance can be minimized as the vibration analysis system becomes more efficient over time. The tangible result of incorporating this system and method is less time required by humans to diagnose problems with building equipment, faster decisions regarding building equipment maintenance, and less building equipment downtime overall.

Building Management System and HVAC System

Figure 2:
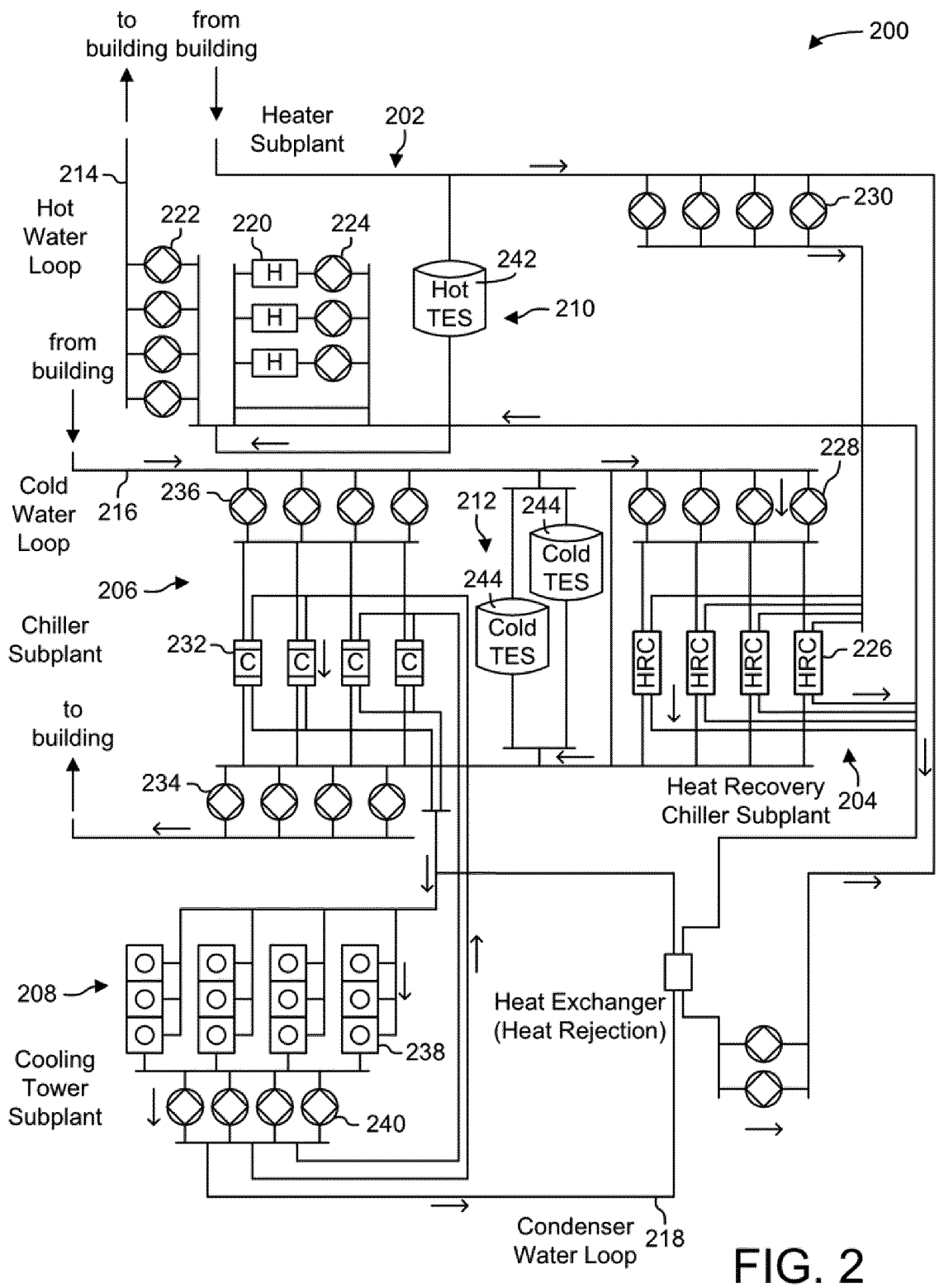
FIG. 2 is a block diagram of a waterside system that may be used in conjunction with the building illustrated in FIG. 1, according to an exemplary embodiment.
Figure 3:
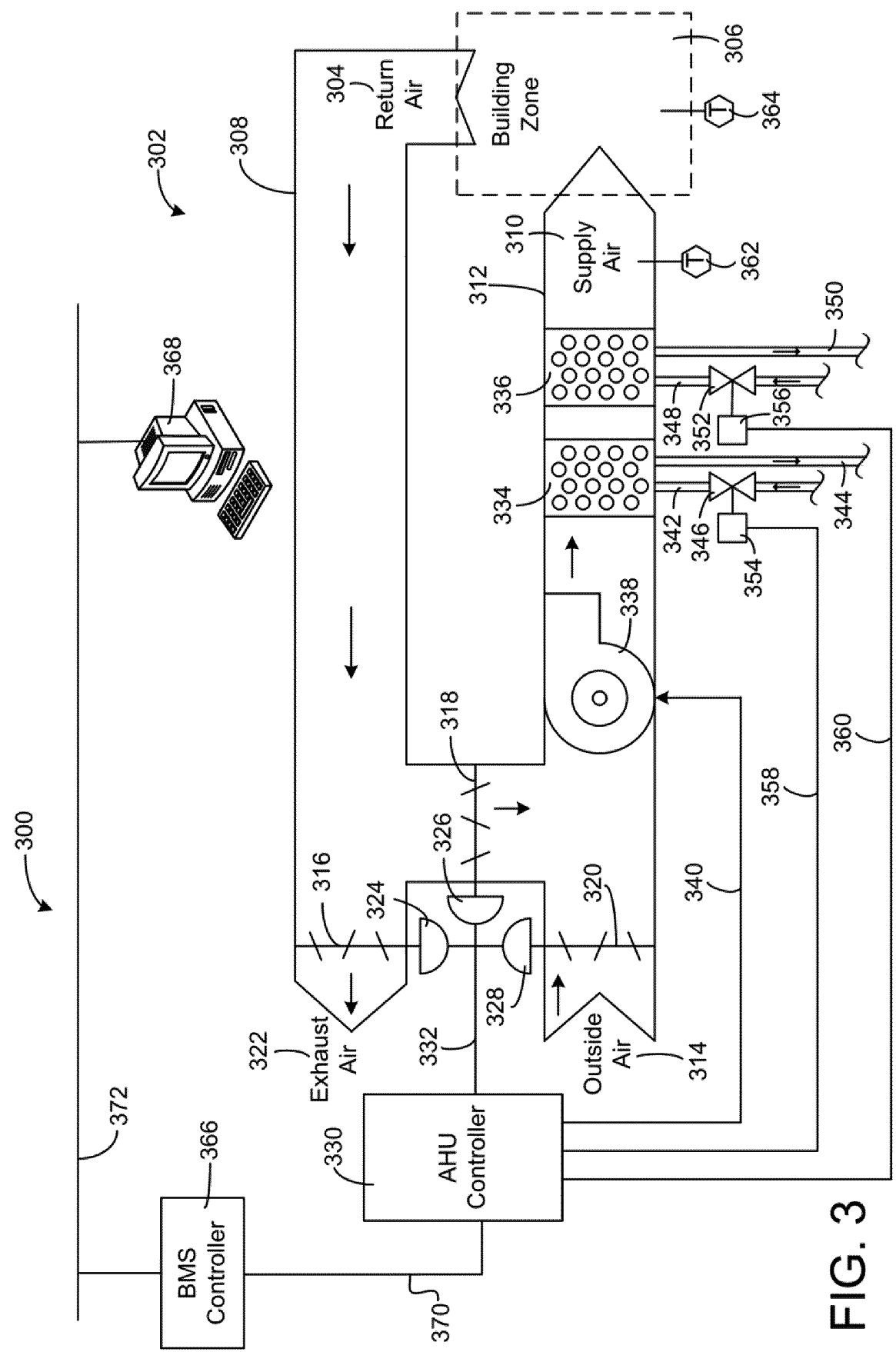
FIG. 3 is a block diagram of an airside system which can be used as part of the HVAC system illustrated in FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In some embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In some embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
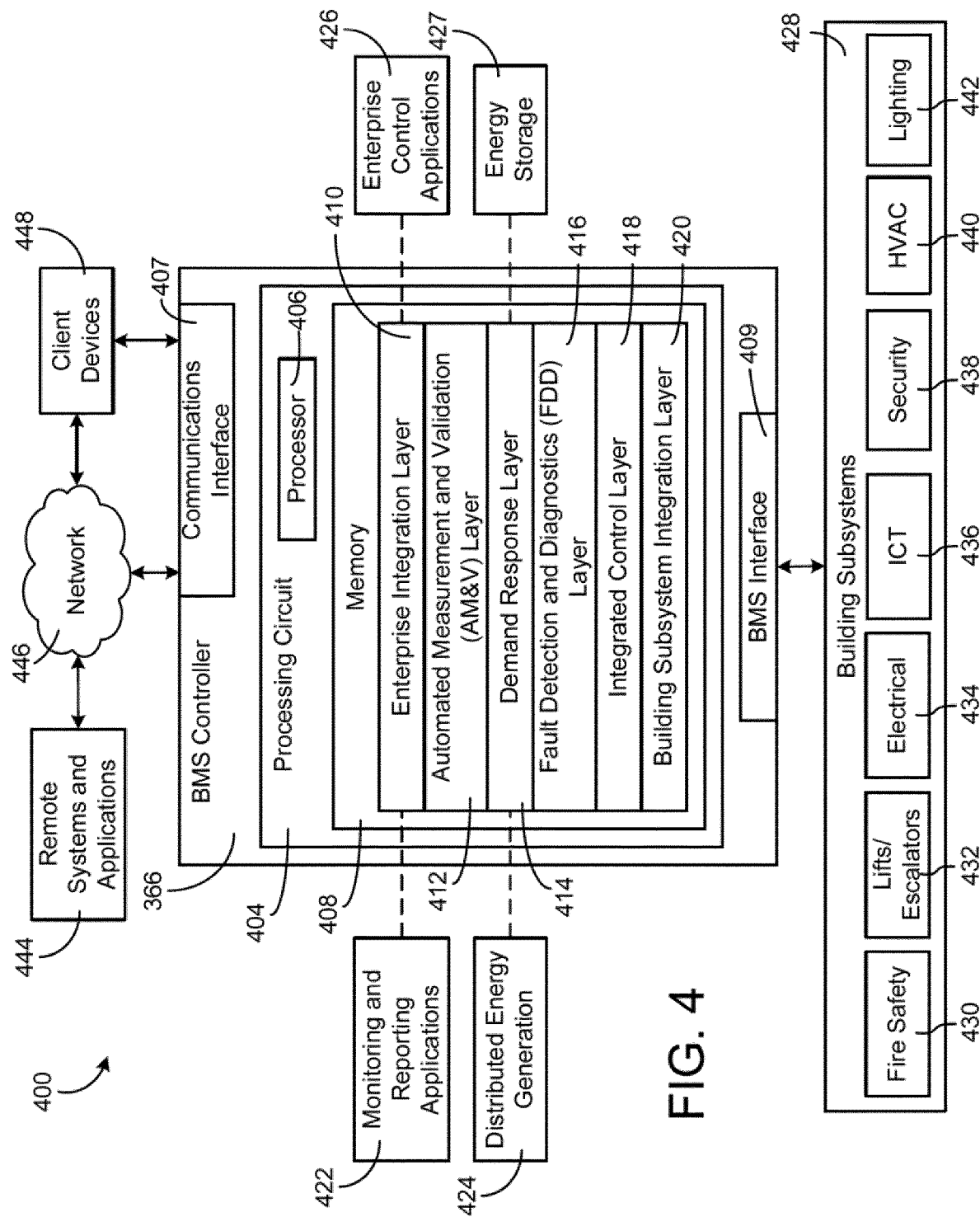
FIG. 4 is a block diagram of a BMS which can be used in the building illustrated in FIG. 1, according to an exemplary embodiment.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In some embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various some embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In some embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
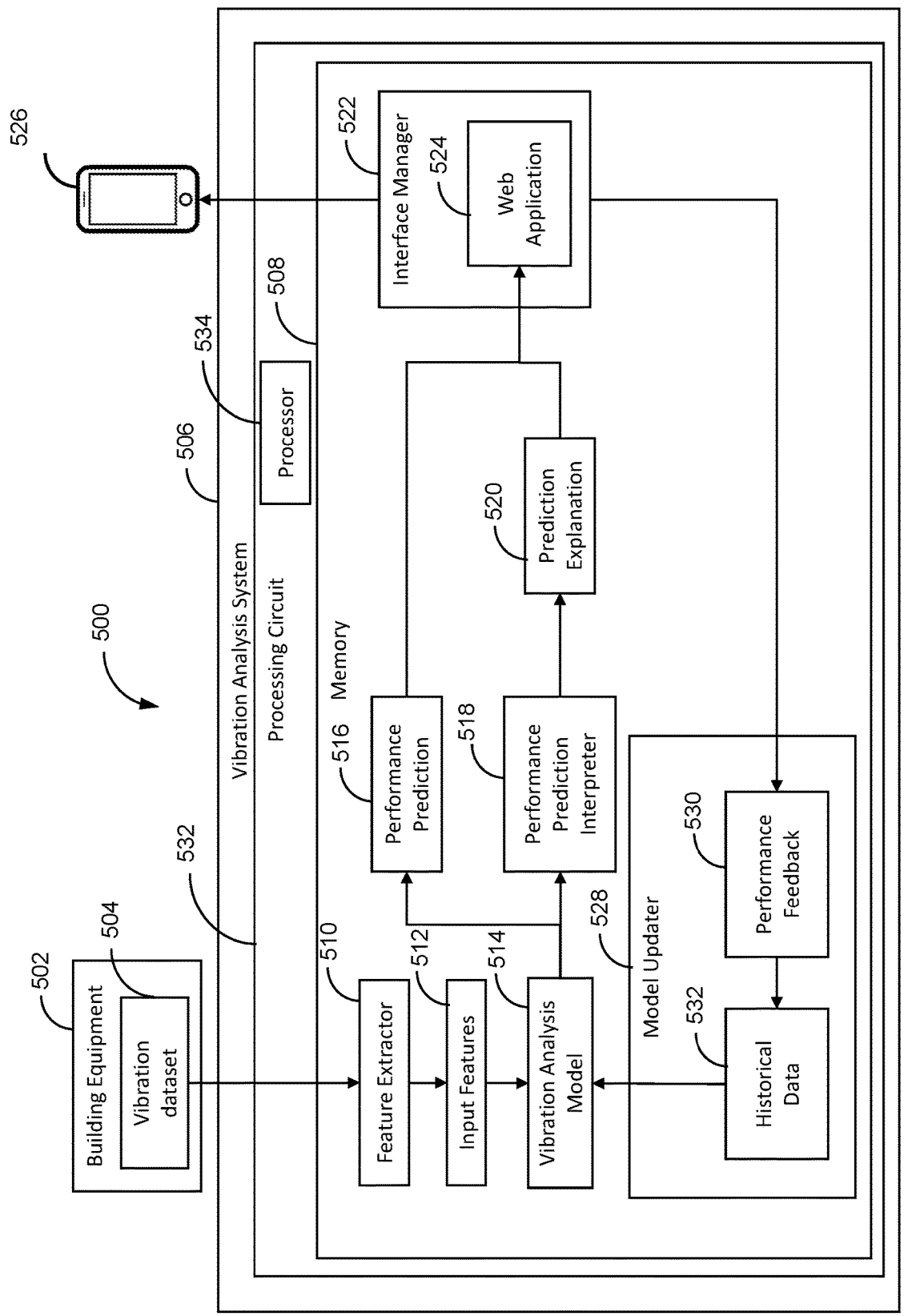
FIG. 5 is a block diagram illustrating a vibration analysis system that can generate performance predictions for building equipment and explanations of the performance predictions, according to an exemplary embodiment.

Referring now to FIG. 5, a block diagram of a system 500 is shown, according to an exemplary embodiment. System 500 includes building equipment 502, a vibration analysis system 506, and a display device 526. Building equipment 502 includes a vibration dataset 504. In some embodiments, vibration analysis system 506 is a standalone system that is not part of building equipment 502. In some embodiments, vibration analysis system 506 may be integrated within building equipment 502.

In some embodiments, building equipment 502 can be any of the building equipment described in FIGS. 1-3, e.g., boilers, chillers, variable air volume units, heating coils, cooling coils, fans, etc. In addition, building equipment 502 can include industrial process equipment (e.g., equipment used in manufacturing environments) and any other equipment that may generate vibration data that can be aggregated into vibration dataset 504 for analysis. The vibration data included in vibration dataset 504 can be measured by an accelerometer or any other vibration sensor (e.g., a strain gauge, gyroscope, velocity sensor, etc.) configured to measure the vibration of building equipment 502. In some embodiments, vibration dataset 504 can be measured by sensors within building equipment 502. In other embodiments, vibration dataset 504 can be measured by sensors external to building equipment 502. As building equipment 502 is operating, the accelerometer can measure the acceleration of the internal components of building equipment 502 as the internal components vibrate under operating conditions. The acceleration measured by the accelerometer can then be converted to spectral vibration data features based on velocity peaks that correspond to certain operating frequencies of building equipment 502.

In some embodiments, vibration dataset 504 includes data to indicate whether building equipment 502 is operating normally or whether building equipment 502 is operating abnormally and may need to undergo preventive maintenance. In some embodiments, vibration dataset 504 includes the amplitude of equipment vibrations at specific frequencies measured continuously over time. In some embodiments, vibration dataset 504 includes the amplitude of equipment vibrations at specific frequencies measured at discrete times.

In some embodiments, display device 526 is a mobile phone, however in some embodiments display device 526 may be any other type of device that is capable of receiving and displaying data. Non-limiting examples of display device 526 include tablet computers, laptop computers, desktop computers, smart watches, and fitness trackers.

Vibration analysis system 506 includes a processing circuit 532. Processing circuit 532 includes a processor 534 and a memory 508. Vibration analysis system 506 can be implemented locally within a building and/or remote from a building. Vibration analysis system 506 can be implemented in a server, multiple servers, a cloud computing platform (e.g., MICROSOFT AZURE, AMAZON WEB SERVICES, etc.), a controller, via microservices across multiple computing devices, and/or on (or distributed across) any other computing device or system. In some embodiments, vibration analysis system 506 is implemented via processing circuit 532 (e.g., a memory and/or a processor) and/or implemented across multiple processing circuits 532 (e.g., multiple memories and/or processors).

Processor 534 can be a general purpose processor, an application specific integrated circuit (ASIC), one or more field programmable gate arrays (FPGAs), a group of processing components, or other suitable electronic processing components. Processor 534 can be communicatively coupled to the memory 508. Memory 508 can include one or more devices (e.g., memory units, memory devices, storage devices, etc.) for storing data and/or computer code for completing and/or facilitating the various processes described in the present disclosure. Memory 508 can include random access memory (RAM), read-only memory (ROM), hard drive storage, temporary storage, non-volatile memory, flash memory, optical memory, or any other suitable memory for storing software objects and/or computer instructions. Memory 508 can include database components, object code components, script components, or any other type of information structure for supporting the various activities and information structures described in the present disclosure. Memory 508 can be communicably connected to processor 508 via processing circuit 532 and can include computer code for executing (e.g., by processor 508) one or more processes described herein.

Memory 508 is shown to include a feature extractor 510, input features 512, a vibration analysis model 514, a performance prediction 516, a performance prediction interpreter 518, a prediction explanation 520, an interface manager 522, and a model updater 528. Interface manager 522 is shown to include a web application 524, and model updater 528 is shown to include performance feedback 530 and historical data 532.

Feature extractor 510 is configured to receive vibration dataset 504 and extract the spectral vibration data features, in some embodiments. In some embodiments, feature extractor 508, if necessary, manipulates vibration dataset 504 such that the vibration data features are in condition to be analyzed. Feature extractor 510 is configured to manipulate vibration dataset 504 using techniques such as a discrete Fourier transform or a fast Fourier transform, in some embodiments. After feature extractor 510 extracts the spectral vibration data features, the spectral vibration data features are used as input features 512 for vibration analysis model 514. In some embodiments, when feature extractor 510 receives vibration dataset 504, vibration dataset 504 may be encoded such that the data must be decoded before being analyzed. In some embodiments, when feature extractor 510 receives vibration dataset 504, vibration dataset 504 may include vibration data from more than one component of building equipment 502.

Input features 512 are the decoded spectral vibration data features found by the feature extractor 510. In some embodiments, the spectral vibration data features can include data and/or data points indicating the amplitude of the acceleration of vibrating components and the time at which those amplitudes occur. In some embodiments, the spectral vibration data features can include data and/or data points indicating the amplitude of the acceleration of vibrating components and the frequencies at which those amplitudes occur.

Vibration analysis model 514 is configured to receive inputs, input features 512 and/or historical data 532. In some embodiments, historical data 532 includes past vibration data from building equipment 502 and/or information on how the past vibration data from building equipment 502 correlated with the relative health of building equipment 502. For example, historical data 532 may include information as to whether certain vibration signatures indicated whether building equipment 502 was in need of maintenance or repair. Vibration analysis model 514 is configured to compare input features 512 with historical data 532 to determine whether, based on historical data 532 and input features 512, building equipment 502 is operating normally, in need of preventive maintenance, or is in danger of shutting down or malfunctioning. The determination is then sent to performance prediction 516 and performance prediction interpreter 518.

In some embodiments, vibration analysis model 514 can include one or more learning algorithms (e.g., supervised learning, unsupervised learning, reinforcement learning, etc.) to generate the determination. In some embodiments, vibration analysis model 514 can include one or more learning processes or techniques (e.g., feature learning, sparse dictionary learning, anomaly detection, decision trees, association rules, etc.) within the learning algorithms. In some embodiments, vibration analysis model 514 can include one or more learning models (e.g., artificial neural networks, support vector networks, Bayesian networks, genetic algorithms, etc.) to generate the determination. Any of the learning algorithms, learning processes and/or techniques, or learning models can be used to train vibration analysis model 514 to make more accurate determinations based on the available data.

Performance prediction 516 is configured to receive the determination from vibration analysis model 514 and creates a prediction for building equipment 502 based on the determination. In some embodiments, performance prediction 516 can indicate that building equipment 502 is operating normally. In some embodiments, performance prediction 516 can indicate that building equipment 502 is in need of preventive maintenance. In some embodiments, performance prediction 516 can indicate that building equipment 502 is in danger of shutting down. The prediction created by performance prediction 516 is then sent to web application 524.

Performance prediction interpreter 518 is configured to receive the determination from vibration analysis model 514 and interpret the determination of vibration analysis model 514. Performance prediction interpreter 518 is configured to compare the determination from vibration analysis model 514 with the vibration data to generate a conclusion of why vibration analysis model 514 made the determination it did regarding building equipment 502. In some embodiments, performance prediction interpreter 518 can be updated with user feedback in a manner similar to vibration analysis system 514 such that performance prediction interpreter 518 can be trained. In some embodiments, vibration analysis model 514 can determine that building equipment 502 is in need of preventive maintenance, and performance prediction interpreter 518 can conclude that the reason for the determination is that the vibration data included a high vibration amplitude at a specific frequency that indicates a repair is needed. The reason for the determination is then sent to prediction explanation 520.

Prediction explanation 520 is configured to notify a user of the reason performance prediction interpreter 518 generated its conclusion regarding building equipment 502. In some embodiments, prediction explanation 520 can include text (e.g., "high amplitude signal at resonant frequency"). In some embodiments, prediction explanation 520 can include a different visual notification (e.g., color highlight, flashing text and/or color, different shapes surrounding text, etc.). In some embodiments, prediction explanation 520 can include an audio notification (e.g., a voice stating the explanation, an alarm and/or otherwise unpleasant sound, etc.) In some embodiments, prediction explanation 520 can include a haptic notification (e.g., a vibration, tapping sensation, etc.). The reason created is then sent to web application 524.

Interface manager 522 is configured to present performance prediction 516 and prediction explanation 520 from web application 524 to a user via display device 526. Because display device 526 may be any number of devices, interface manager 522 can determine the type of display device 526 a user is using and present the information in a suitable manner. In some embodiments, display device 526 may be a mobile phone and interface manager 522 can present information in the correct format for a mobile phone and enable touch controls. In some embodiments, display device 526 may be a laptop computer and interface manager 522 can present information in the correct format for a laptop computer and enable mouse and keyboard controls.

Web application 524 can be any type of computer program that can be run in a web browser on display device 526, in some embodiments. Web application 524 is configured to receive performance prediction 516 and prediction explanation 520 and incorporate performance prediction 516 and prediction explanation 520 into web application 524 such that a user can access the information via interface manager 522. Web application 524 is also configured to receive user feedback based on performance prediction 516 and prediction explanation 520, and forward the user feedback to model updater 528. The user can enter feedback into web application 524 via display device 526, and the feedback can include whether the user agrees or disagrees with the performance prediction 516 and the prediction explanation 520.

Model updater 528 is configured to update or train vibration analysis model 514 based on performance feedback 530 and historical data 532. In some embodiments, model updater 528 compiles performance feedback 530 and historical data 532 and provides an update to vibration analysis model 514. In some embodiments, model updater 528 provides vibration analysis model 514 performance feedback 530 and historical data 532, and vibration analysis model 514 updates itself with the provided information.

Performance feedback 530 receives feedback from the user after the user has analyzed prediction performance 516 and prediction explanation 520, and then forwards the user feedback to historical data 532. In some embodiments, the user feedback can be binary feedback, e.g., the user can indicate agreement or disagreement with performance prediction 516 and/or prediction explanation 520. In some embodiments, the user feedback can be text entered into a text box by the user and incorporated into performance feedback 530 via natural language processing. In some embodiments, the user feedback can be the voice of the user recording the reasons for agreement or disagreement with prediction performance 516 and prediction explanation 520, and the voice recording can be incorporated into performance feedback 530 via speech recognition methods.

Historical data 532 is configured to receive the user feedback from performance feedback 530 and incorporate the user feedback into historical data 532. After the user feedback is incorporated into historical data 532, subsequent analyses performed by vibration analysis model 514 can include the user feedback.

Figure 6:
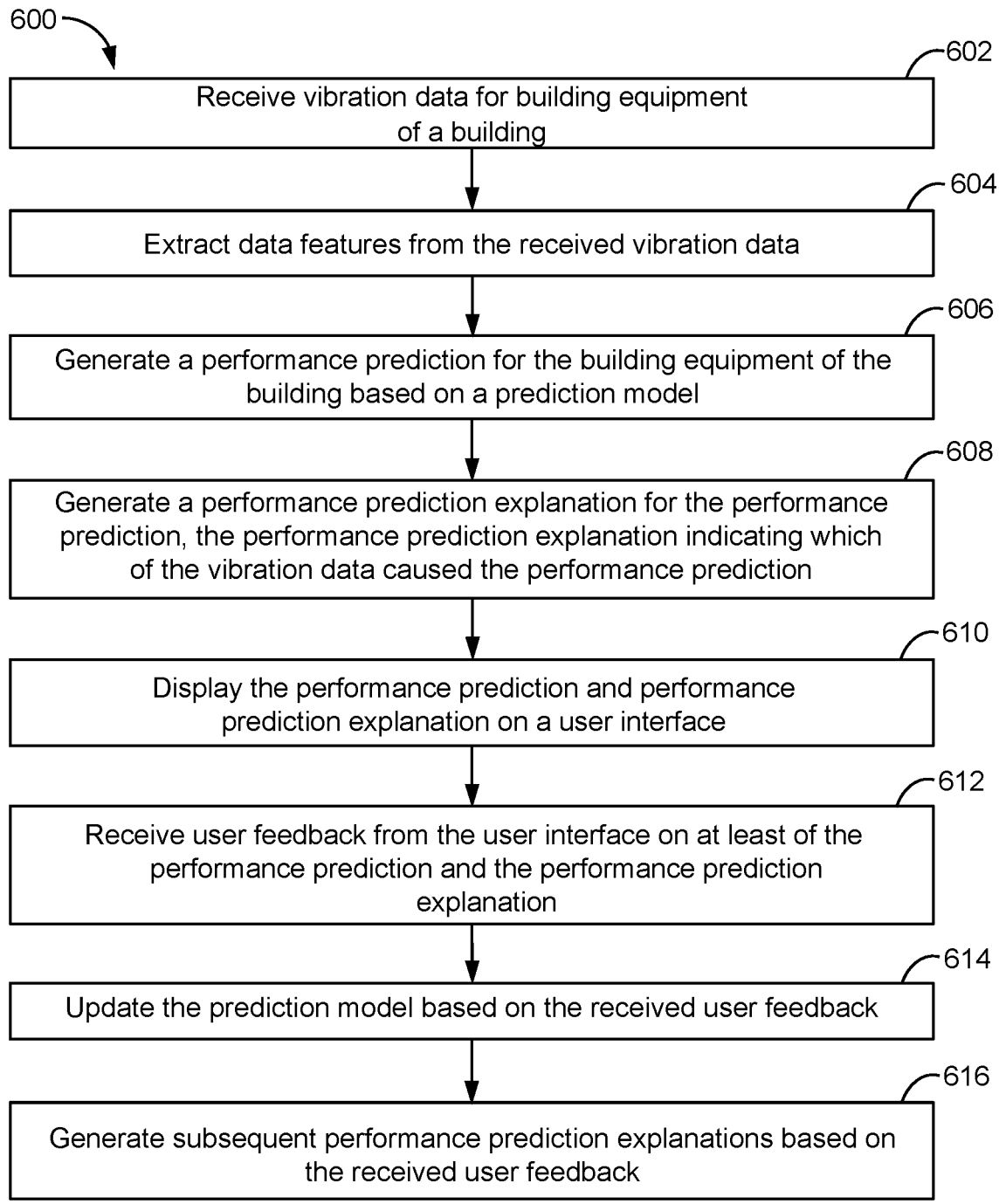
FIG. 6 is a flow diagram of a process of generating the performance predictions and the explanations of the performance predictions that can be performed by the vibration analysis system illustrated in FIG. 5, according to an exemplary embodiment.

Referring now to FIG. 6, a flow diagram of a process 600 of generating a performance prediction and an explanation for the performance prediction is shown, according to some embodiments. The vibration analysis system 506 can be configured to perform the process 600. Furthermore, any other computing device described herein (for example, building equipment 502 itself), can be configured to perform the process 600.

In step 602, vibration data is received for building equipment 502 of a building. Building equipment 502 (i.e., a chiller from a HVAC system) may be operating. During operation, building equipment 502 can produce vibrations, and those vibrations can be captured by a sensor of the building equipment 502 to produce the vibration dataset 504. Vibration dataset 504 can include data that is indicative of whether building equipment 502 is operating normally or whether building equipment 502 is operating abnormally and may need to undergo preventive maintenance.

In step 604, data features are extracted from the received vibration data. Feature extractor 510 receives vibration dataset 504 from building equipment 502 and then manipulates vibration dataset 504 using a mathematical method like a discrete Fourier transform or a fast Fourier transform to extract the spectral vibration features of the data. The manipulation puts vibration dataset 504 in condition to be an input feature 512 to vibration analysis model 514.

In step 606, a performance prediction is generated for building equipment 502 based on a prediction model. Consider an HVAC chiller as building equipment 502 that may be in need of repair because of an unacceptable motor shaft. Historical data 532 may include previous data from the same chiller or other chillers that had an unacceptable motor shaft. When vibration analysis model 514 compares vibration dataset 504 to historical data 532, vibration analysis model 514 would find that vibration dataset 504 is similar to other data within historical data 532 that is indicative of an unacceptable motor shaft. Vibration analysis model 514 would therefore predict that the chiller has an unacceptable motor shaft, and performance prediction 516 would be generated to indicate the chiller has an unacceptable motor shaft.

In some embodiments, when comparing vibration dataset 504 to historical data 532, vibration analysis model 514 may not be able to predict the performance of the HVAC chiller. For example, vibration dataset 504 may include an anomaly for which vibration analysis model 514 has no comparison (e.g., it is the first time the anomaly has occurred) in historical data 532. In such cases, performance prediction 516 may include the anomalous data for review by a user, but not include a prediction regarding the performance of the HVAC chiller.

In step 608, an explanation for performance prediction 516 is generated to explain the reasoning behind performance prediction 516. When vibration analysis model 514 generates performance prediction 516, performance prediction 516 is based on historical data 532, i.e., there is a reason that vibration analysis model 514 generated performance prediction 516. The reason behind performance prediction 516 is generated by vibration analysis model 514 and included in performance prediction interpreter 518. The prediction interpretation 518 is then included in the prediction explanation 520, which explains the reasoning behind performance prediction 516. The reasoning can include which of the vibration data caused the performance prediction.

Returning to the HVAC chiller example, vibration analysis model 514 may have predicted that the chiller has an unacceptable motor shaft based on vibration dataset 504. However, there may be a number of different reasons behind the conclusion that the chiller has an unacceptable motor. For example, the chiller may exhibit an abnormally high amplitude peak at the fundamental frequency of the chiller motor. Vibration analysis model 514 would interpret the dataset 504 to determine that the high amplitude peak is the reason performance prediction 516 indicated that the chiller has an unacceptable motor shaft. Performance prediction interpreter 518 would include information regarding the high amplitude peak at the fundamental frequency of the chiller motor, and that information would be sent to prediction explanation 520. Prediction explanation 520 would then provide the explanation as to why the chiller has an unacceptable motor shaft (e.g., because of the high amplitude peak at the fundamental frequency of the chiller motor).

In the case where anomalous data is reported by performance prediction 516 as described above, prediction explanation 520 may include an explanation as to why the anomalous data was reported (e.g., because the data is not consistent with normal performance and does not fit within any known failure modes).

In step 610, the performance prediction 516 and the performance prediction explanation 520 are displayed on a user interface. In some embodiments, performance prediction 516 and prediction explanation 520 can be displayed as text for a user to read. In some embodiments, performance prediction 516 and prediction explanation 520 can be displayed as a combination of text and charts (e.g., bar charts, pie charts, frequency spectrum charts, etc.) for a user to read. For example, the text can notify the user of the determination that the chiller has an unacceptable motor shaft and also indicate that a peak on the chart displayed is the reason the determination was made. In some embodiments, specific sections of text or areas of a chart can be highlighted to draw the attention of the user to those specific sections or areas. The user interface display will be further described with reference to FIG. 7.

In step 612, user feedback based on the performance prediction 516 and the prediction explanation 520 are received. After the user reviews the performance prediction 516 and the prediction explanation 520 on display device 526, the user can enter feedback via web application 524.

In step 614, the prediction model is updated based on the user feedback. After performance feedback 530 receives user feedback from interface manager 522, the user feedback is incorporated into historical data 532 and is included in vibration analysis model 514 via model updater 528. In this way, vibration analysis model 514 learns not only from feedback within the model, but from a user that inputs information into the model. Vibration analysis model 514 then becomes more robust over time as additional data is incorporated into the model via model updater 528. Vibration analysis model 514 may incorporate the new data via any number of ways including, but not limited to, deep neural networks, artificial neural networks, and image recognition models.

In step 616, a subsequent performance prediction explanation is generated based on the feedback from the user. When a subsequent analysis of equipment is initiated, vibration analysis model 514 is configured to reference historical data 532 in determining performance prediction 516 and prediction explanation 520. Thus, performance prediction 516 and prediction explanation 520 can change over time. For example, vibration analysis model 514 may predict that equipment is in need of preventive maintenance based on historical data 532. However, the user may provide feedback notifying vibration analysis model 514 that the prediction is incorrect and provide the reasons why. After incorporating the feedback of the user into historical data 532, vibration analysis model 514 can predict that the equipment is not in need of preventive maintenance during a subsequent analysis under the same conditions.

Figure 7:
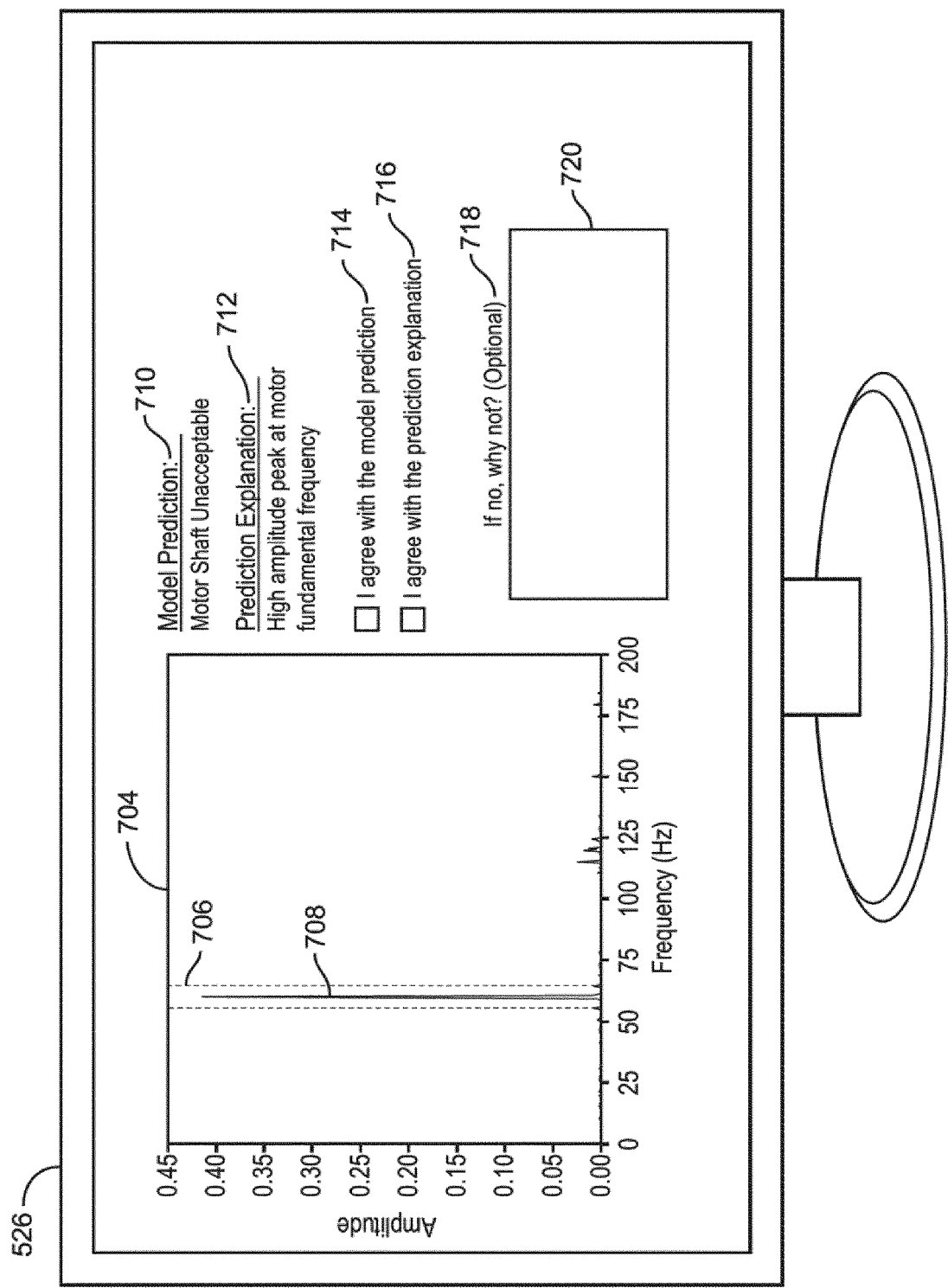
FIG. 7 is a schematic drawing of a user interface which can be generated by the machine performance prediction system of FIG. 5, according to an exemplary embodiment.

FIG. 7 illustrates a user interface on display device 526. Display device 526 is shown to include a graph 704, a model prediction 710, a prediction explanation 712, a prediction agreement box 714, a prediction explanation agreement box 716, and a disagreement section 718. Graph 704 further includes a highlighted section 706 and a peak 708, and disagreement section 718 further includes a disagreement explanation box 720.

Graph 704 can be a representation of the vibration amplitude versus the amplitude frequency. The peak 708 can indicate a frequency at which the high-amplitude vibration occurred. The highlighted section 706 can indicate the frequency range over which vibration analysis model 514 has indicated the high amplitude vibration can occur.

Model prediction 710 indicates the performance prediction 516 to a user. For example, vibration analysis system 506 predicted that the motor shaft being analyzed is unacceptable. Model prediction 710 therefore indicates to the user that the motor shaft is unacceptable.

Prediction explanation 712 indicates the prediction explanation 520 to a user. For example, vibration analysis system 506 based its determination of an unacceptable motor shaft on the existence of a high amplitude peak at the fundamental frequency of the motor. Prediction explanation 712 therefore indicates to the user that the reason the motor shaft was determined to be unacceptable is due to the high amplitude peak at the fundamental frequency of the motor.

When a user views the data on display device 526, the user sees that graph 704 shows peak 708 at a specific amplitude and frequency, and that peak 708 is highlighted by highlighted section 706. The user also sees that model prediction 710 indicates that vibration analysis model 514 has predicted that the motor shaft is unacceptable. Prediction explanation 712 alerts the user that the reason the motor shaft is unacceptable is because of peak 708 that is highlighted by highlighted section 706. The user can then analyze the data presented and compare the results to the knowledge of the user of when a motor shaft is unacceptable. If the user agrees that the motor shaft is unacceptable because of peak 708, the user may check prediction agreement box 714 and prediction explanation agreement box 716, respectively.

In some embodiments, if the user does not agree with model prediction 710, the user may not check prediction agreement box 714. The user may further include the reason for not agreeing with model prediction 710 by writing those reasons in disagreement explanation box 720. For example, the user may believe that the motor shaft is acceptable even though the user agrees with the data shown in graph 704, and the user would indicate the reason(s) the motor shaft is acceptable in disagreement explanation box 720.

In some embodiments, if the user does not agree with prediction explanation 712, the user may not check prediction explanation agreement box 716. The user may further include the reason for not agreeing with the prediction explanation 712 in disagreement explanation box 720. For example, the user may believe that the motor shaft is unacceptable, but the belief may result from a reason other than peak 708 on graph 704.

In some embodiments, the user may disagree with both model prediction 710 and prediction explanation 712. In such cases, the user would check neither prediction agreement box 714 nor prediction explanation agreement box 716. The user may then enter the reason(s) for the disagreement in disagreement explanation box 720 of disagreement section 718.

The system and method described with reference to FIGS. 5-7 may be implemented on a regular, discrete basis, for example on a quarterly basis, to diagnose potential equipment issues or preventive maintenance that needs to occur. However, the system and method as described with reference to FIGS. 5-7 may also be implemented on continuous basis where the system and method are continuously analyzing data from equipment to determine whether any equipment is in need of maintenance.

In addition, a user may intentionally modify some equipment parameters in order to further build up vibration analysis model 514 and make vibration analysis model 514 more robust. For example, a user may intentionally vary a frequency of the equipment in order to see the output provided by vibration analysis model 514. The user can then interact with the system using display 526 to facilitate the deep learning of vibration analysis model 514 by noting whether the user agrees with the performance prediction and performance prediction explanation.

As described, vibration analysis system 506 predicts the performance of building equipment 502 based on vibration data from building equipment 502. However, in other embodiments, other data can be used to support predicting the performance of building equipment 502. In some embodiments, the other data can be dynamic data (e.g., data that can change during equipment or system operation) such as temperature, current, power, etc., that can be indicative of the performance of building equipment 502. In other embodiments, the other data can be static data (e.g., properties of equipment or a machine that are constant) such as gear ratios, bearing geometry, number of impeller blades, etc.

In embodiments in which other data is used to support predicting the performance of building equipment 502, vibration analysis system 506 can be configured to analyze the other data to support determining the performance of building equipment 502. For example, vibration analysis system 506 may receive data related to the gear ratio of a piece of equipment (e.g., static data). The data related to the gear ratio can provide information to vibration analysis system 506 regarding vibration data (e.g., at what frequencies to expect vibration data). As another example, vibration analysis system 506 may receive data related to the machine load (e.g., dynamic data). Data related to the machine load may change over time, and those changes can help the vibration analysis system 506 determine what type of vibration data is expected from a piece of building equipment. As described, vibration analysis system 506 analyzes the information provided by the gear ratio data, the machine load data, and the spectral data to generate a performance prediction and prediction explanation.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A vibration analysis system for predicting performance of building equipment, the system comprising:
   one or more memory devices configured to store instructions that, when executed on one or more processors, cause the one or more processors to:
   receive vibration data from the building equipment, the vibration data indicating the performance of the building equipment;
   generate, based on a prediction model and the vibration data, a performance prediction for the building equipment;
   generate, based on the vibration data, a performance explanation for the performance prediction, the performance explanation comprising an indication of one or more data points of the vibration data associated with the performance prediction and further comprising an explanation indicating one or more reasons that the performance prediction will occur; and
   cause a user interface to display the performance prediction and the performance explanation.

2. The vibration analysis system of claim 1, wherein the instructions cause the one or more processors to:
   receive prior performance data of the building equipment; and
   train the prediction model based on the received prior performance data of the building equipment.

3. The vibration analysis system of claim 1, wherein the instructions cause the one or more processors to:
   receive prior performance data of other building equipment; and
   train the prediction model based on the received prior performance data of the other building equipment.

4. The vibration analysis system of claim 1, wherein the instructions cause the one or more processors to:
   receive, via the user interface, user feedback from a user, the user feedback based on the performance prediction and the performance explanation; and
   train the prediction model based on the user feedback.

5. The vibration analysis system of claim 4, wherein the instructions cause the one or more processors to:
   receive a second vibration data from the building equipment;
   generate, based on the trained prediction model, a second performance prediction for the building equipment, the second performance prediction taking into account the user feedback;

generate, based on the second vibration data, a second performance explanation for the second performance prediction, the second performance explanation comprising an indication of one or more data points of the second vibration data associated with the second performance prediction and further comprising an explanation indicating one or more reasons that the second performance prediction will occur, the second performance prediction based on the user feedback; and cause a user interface to display the second performance prediction and the second performance explanation.

6. The vibration analysis system of claim 4, wherein the user interface comprises selection boxes that the user can interact with to indicate agreement or disagreement with at least one of the performance prediction and the performance explanation.

7. The vibration analysis system of claim 4, wherein the user interface comprises a text box in which the user can enter text to indicate reasons for agreement or disagreement with at least one of the performance prediction and the performance explanation.

8. The vibration analysis system of claim 4, wherein the user interface comprises a chart indicating the vibration data on which at least one of the performance prediction and the performance explanation is based.

9. The vibration analysis system of claim 8, wherein the chart comprises a highlighted area, the highlighted area indicating the one or more data points, wherein values of the one or more data points cause the performance prediction.

10. The vibration analysis system of claim 1, wherein the user interface displays the performance explanation as text.

11. The vibration analysis system of claim 1, wherein the instructions cause the one or more processors to generate an audio message indicating the performance explanation.

12. The vibration analysis system of claim 1, the performance prediction comprising a prediction of the performance of a component of the building equipment.

13. A method for predicting performance of building equipment, the method comprising:

receiving, by a processing circuit, vibration data from the building equipment, the vibration data indicating the performance of the building equipment;

analyzing, by the processing circuit, the vibration data with a data analysis model;

generating, by the processing circuit, a performance prediction for the building equipment, the performance prediction based on the analyzed vibration data and a prediction model;

generating, by the processing circuit, a performance explanation for the performance prediction, the performance explanation comprising an indication of one or more data points of the vibration data associated with the performance prediction and further comprising an explanation indicating one or more reasons that the performance prediction will occur; and displaying, on a user interface by the processing circuit, the performance prediction and the performance explanation to a user.

14. The method of claim 13, wherein the receiving step further comprises:

receiving, by the processing circuit, prior performance data of the building equipment, and;

training, by the processing circuit, the prediction model based on the received prior performance data of the building equipment.

15. The method of claim 13, wherein the receiving step further comprises:

receiving, by the processing circuit, prior performance data of other building equipment; and training, by the processing circuit, the prediction model based on the received prior performance data of the other building equipment.

16. The method of claim 13, further comprising:

receiving, by the processing circuit via the user interface, user feedback from a user, the user feedback based on the performance prediction and the performance explanation; and training, by the processing circuit, the prediction model based on the user feedback.

17. The method of claim 16, further comprising:

receiving, by the processing circuit, a second vibration data from the building equipment;

generating, by the processing circuit, based on the trained prediction model, a second performance prediction for the building equipment, the second performance prediction based on the user feedback;

generating, by the processing circuit, based on the second vibration data, a second performance explanation for the second performance prediction, the second performance explanation comprising an indication of one or more data points of the second vibration data associated with the second performance prediction and further comprising an explanation indicating one or more reasons that the second performance prediction will occur, the second performance prediction taking into account the user feedback; and displaying, on the user interface by the processing circuit, the second performance prediction and the second performance explanation.

18. The method of claim 17, wherein the user interface comprises selection boxes that the user can interact with to indicate agreement or disagreement with the performance prediction and/or the performance explanation.

19. The method of claim 17, wherein the user interface comprises a text box in which the user can enter text to indicate reasons for agreement or disagreement with at least one of the performance prediction and the performance explanation.

20. A building system of a building, the system comprising:

building equipment configured to operate to control one or more environmental conditions of the building, wherein the building equipment comprise one or more vibration sensors configured to collect vibration data while the building equipment operates to control the one or more environmental conditions;

a processing circuit configured to:

receive the vibration data from the building equipment, the vibration data indicating performance of the building equipment;

generate, based on a prediction model and the vibration data, a performance prediction for the building equipment;

generate, based on the vibration data, a performance explanation for the performance prediction, the performance explanation comprising an indication of one or more data points of the vibration data associated with the performance prediction and further comprising an explanation indicating one or more reasons that the performance prediction will occur; and cause a user interface to display the performance prediction and the performance explanation.

* * * * *